UNITED STATES PATENT OFFICE.

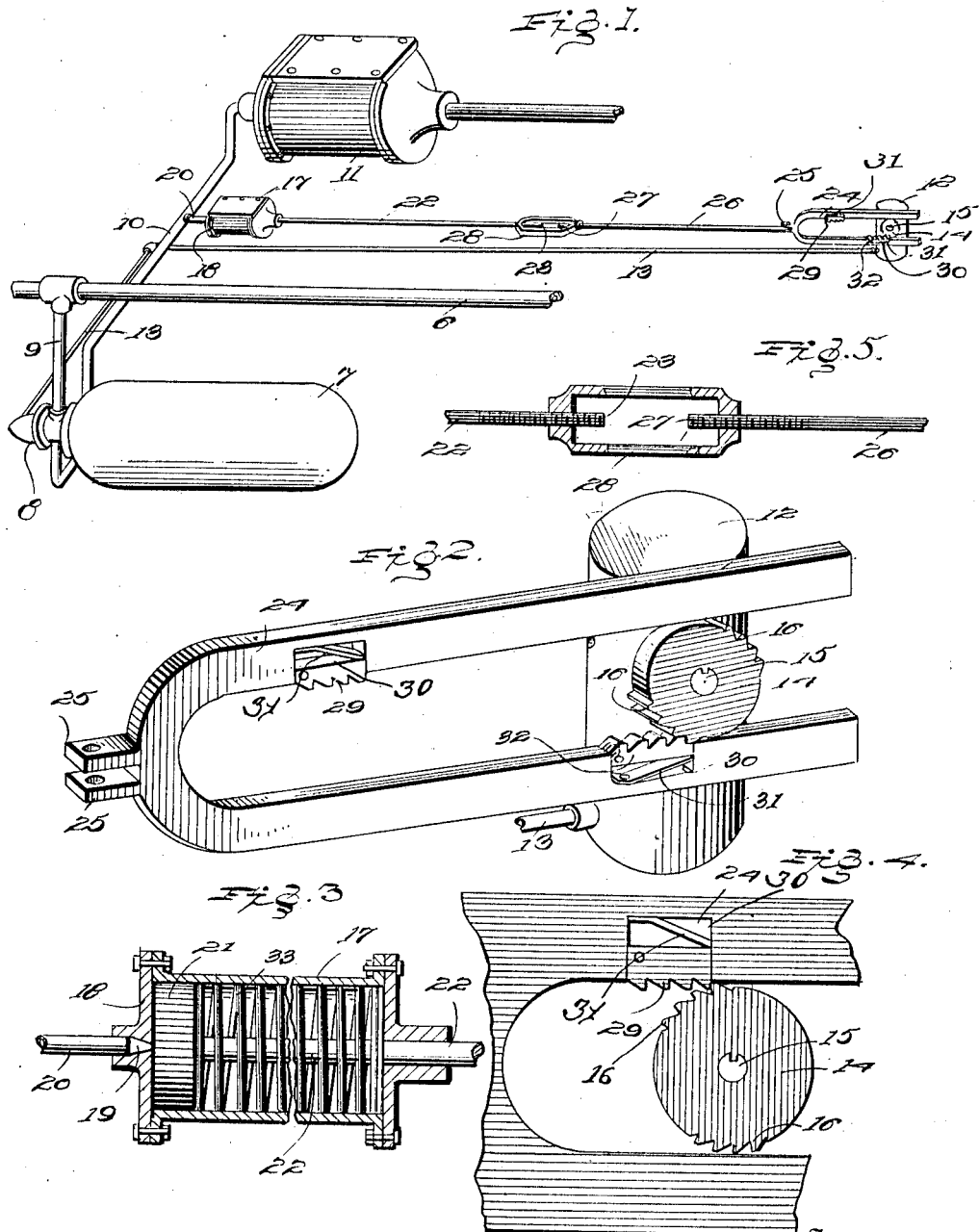

LEONARD L. BROWN, OF CLIFTON FORGE, VIRGINIA, AND JOHN FRANKLING SMITH, OF RONCEVERTE, WEST VIRGINIA.

AUTOMATIC AIR-RETAINER.

1,040,873.  Specification of Letters Patent.  Patented Oct. 8, 1912.

Application filed December 21, 1910. Serial No. 598,551.

*To all whom it may concern:*

Be it known that we, LEONARD L. BROWN and JOHN FRANKLING SMITH, citizens of the United States, respectively of Clifton Forge, in the county of Alleghany and State of Virginia, and of Ronceverte, in the county of Greenbrier and State of West Virginia, have invented certain new and useful Improvements in Automatic Air-Retainers, of which the following is a specification, reference being had therein to the accompanying drawing.

This invention relates to air brake systems for use in connection with trains on mountainous roads wherein it is necessary to frequently operate the retaining valves, so that sufficient pressure will be retained to operate the system, such, for example, as when re-charging, and the principal object of the same is to provide novel means whereby the said retaining valves are automatically operated by the pressure from the auxiliary reservoir.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a fragmentary diagrammatic view of a brake system for a car equipped with the improved retaining valve operating means. Fig. 2 is a detail perspective view of the retaining valve and the operating fork therefor. Fig. 3 is a fragmentary vertical longitudinal sectional view of the cylinder and piston for operating the fork shown in Fig. 2. Fig. 4 is a fragmentary detail view in elevation of the fork and valve operating means, the fork being shown in position for operating the valve in a direction opposite that shown in Figs. 1 and 2. Fig. 5 is a detail fragmentary view of the piston rod and fork rod and the means for adjustably connecting the same.

Referring to the accompanying drawings by numerals, 6 designates a train pipe, 7 the auxiliary reservoir equipped with a triple valve 8 having a pipe 9 connecting with the train line 6 and a similar connection 10 with the brake cylinder 11.

12 designates the retaining valve having a pipe line connection 13 with the triple valve 8.

The brake system briefly described is of a well known type.

The improved retaining valve operating mechanism comprises a gear 14 that is fast on the stem 15 of the retaining valve 12 and provided with oppositely disposed sets of peripheral teeth 16.

A cylinder 17 has its head 18 provided with a transversely arranged opening 19 that tapers longitudinally and into which a pipe 20 extends that is suitably coupled to the pipe 10 that connects the brake and auxiliary cylinders. A piston 21 is slidable in cylinder 17 and its rod 22 projects well beyond the rear end of said cylinder and has its rear end 23 threaded. A valve operating fork 24 has its head equipped with a pair of ears 25 to which one end of a rod 26 is pivoted. The other end 27 of said rod 26 is threaded, and a turnbuckle 28 adjustably connects the threaded end of rod 26 to the threaded end of piston rod 22. The fork 24 straddles valve gear 14 and its upper arm has its undersurface provided with ratchet teeth 29 adjacent the head of said fork. The lower arm of the fork 24 has its upper surface provided with a recess 30 in which a spring 31 is fastened. A rack 32 has one end pivotally fastened in said recess and is seated on the spring 31. The spring 31 constantly tends to raise said rack from the recess 29. A spring 33 is coiled about piston rod 22 within cylinder 17 and tends to retain the piston 21 at the head of said cylinder.

In the operation of this device a light application of the brakes causes pressure to be admitted to the brake cylinder which passes to the cylinder 17 and moves the piston 21 against the action of the spring 33 so that the rack 32 serves to close the valve 12 in the pipe 13 leading to the triple valve exhaust.

When it is desired to recharge the reservoir the train pipe pressure is increased to a sufficient degree to move the triple valve to release position but the brake cylinder pressure is retained by the valve 12 in the pipe 13. If this brake cylinder pressure becomes reduced through leakage, thus permitting the piston 21 to be returned by the spring 33, the spring 31 permits the rack 32 to slide by the pinion 14 without turning the valve 12 to open position.

In order to release the brakes a heavy application of the brakes is made moving the piston 21 sufficiently far out so that the rack 29 engages the pinion 14 and turns the valve 12 to its open position. The train pipe pressure is then increased sufficiently to move the triple valve to the released position and thus exhaust the pressure from the brake cylinder.

By reason of the release of the brake cylinder pressure, the spring 33 returns the piston 21 and during this movement the racks 29 and 32 slide over the pinion 14 without moving the valve 12 from its open position.

What we claim as our invention is:—

1. In an air brake system, the combination with a retaining valve, of a gear carried by the stem thereof, a fork provided with upper and lower racks for operating said gear to control said valve, and means for automatically actuating said fork.

2. In an air brake system, the combination with a retaining valve, of a pressure cylinder, a piston therein actuated by the pressure from the air brake system, a fork actuated by said piston, rotating means carried by said valve, and racks carried by said fork for actuating said rotating means.

3. In an air brake system, the combination with a brake cylinder, auxiliary reservoir, retaining valve and the pressure connection between said cylinder and reservoir, of means actuated by a relatively low pressure in said connection for closing said valve and by the maximum pressure in said connection for opening said valve.

4. An air brake system comprising a retaining valve, a gear carried thereby, a fork straddling said gear and provided with an upper rack, a yieldable lower rack carried by said fork, and means for automatically operating said fork to cause the racks to engage said gear to first close and then open said valve.

5. An air brake system comprising a cylinder, a piston therein, a rod for said piston, a spring on said rod opposing movement of the same in one direction, a fork provided with retainer valve operating means, a rod carried by said fork, means for adjustably connecting the piston rod to the fork rod, and pressure admitting means carried by said cylinder.

6. Means for operating the retainer valve of an air brake system comprising a gear carried by said valve, a fork provided with spaced racks for engaging said gear to first close and then open said valve, and means for automatically actuating said fork.

7. Means for operating the retainer valve of an air brake system comprising a gear for operating said valve, a fork straddling said gear and provided with upper teeth for engaging said gear, said fork provided with a lower recess, a spring seated in said recess, a rack pivotally fastened in said recess and resting on said spring, and means for actuating said fork.

In testimony whereof we hereunto affix our signatures in presence of two witnesses.

LEONARD L. BROWN.
JOHN FRANKLING SMITH.

Witnesses:
  JAS. R. JOHNSON,
  H. B. MOORE.

---

Copies of this patent may be obtained for five cents each, by addressing the "Commissioner of Patents, Washington, D. C."